(12) United States Patent
Cairns et al.

(10) Patent No.: US 7,957,485 B2
(45) Date of Patent: Jun. 7, 2011

(54) REDUCED COMPLEXITY PARAMETRIC COVARIANCE ESTIMATION FOR PRECODED MIMO TRANSMISSIONS

(75) Inventors: Douglas A. Cairns, Durham, NC (US); Stephen J. Grant, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 610 days.

(21) Appl. No.: 12/036,337

(22) Filed: Feb. 25, 2008

(65) Prior Publication Data

US 2009/0213945 A1 Aug. 27, 2009

(51) Int. Cl.
*H04B 7/02* (2006.01)
*H04L 1/02* (2006.01)

(52) U.S. Cl. ........................................ 375/267; 375/148

(58) Field of Classification Search .................. 375/260, 375/267, 316, 346, 148
See application file for complete search history.

(56) References Cited

U.S. PATENT DOCUMENTS

| | | |
|---|---|---|
| 6,005,887 A | 12/1999 | Bottomley et al. |
| 2005/0069023 A1 | 3/2005 | Bottomley et al. |
| 2005/0201447 A1 | 9/2005 | Cairns et al. |
| 2006/0256843 A1* | 11/2006 | Grant et al. .................. 375/148 |

OTHER PUBLICATIONS

Jonsson, E. et al. "Receiver Parametric Convariance Estimation for Transmit Diversity." Co-pending U.S. Appl. No. 11/751,109, filed May 21, 2007.
Bottomley, G. E. et al. "A Generalized RAKE Receiver for Interference Suppression." IEEE Journal on Selected Areas in Communications, vol. 18, No. 8, Aug. 2000, pp. 1536-1545.
Fulghum, T. L. et al. "Method and Apparatus for Determining Combining Weights for MIMO Receievers." Co-pending U.S. Appl. No. 11/613,677, filed Dec. 20, 2006.

* cited by examiner

*Primary Examiner* — Chieh M. Fan
*Assistant Examiner* — Freshteh N Aghdam
(74) *Attorney, Agent, or Firm* — Coates & Bennett, P.L.L.C.

(57) ABSTRACT

A model-based technique for estimating impairment covariance associated with a MIMO signal is disclosed. In an exemplary method, an impairment model is constructed for a received composite information signal comprising at least a first data stream transmitted from first and second antennas according to a first antenna weighting vector. The impairment model includes first and second model terms corresponding to the first and second antennas, respectively, but in several embodiments does not include a cross-antenna interference term. In another embodiment, an impairment model for a received MIMO signal is constructed by computing an impairment model term for each antenna and an additional term to account for preceding interference in a single-stream MIMO transmission scenario. The impairment terms are grouped so that only two associated scaling terms are unknown; values for the scaling terms are estimated by fitting the model to measured impairment covariance values.

26 Claims, 6 Drawing Sheets

REDUCED COMPLEXITY PARAMETRIC COVARIANCE ESTIMATION FOR PRECODED MIMO TRANSMISSIONS

FIELD OF THE INVENTION

The present invention relates generally to wireless communication systems, and in particular to a parametric system and method for covariance estimation in a wireless communication system employing precoded multiple-input multiple-output (MIMO) transmissions.

BACKGROUND

Spread-spectrum communication systems are well known in the art and widely deployed. A class of receivers well suited for use in spread-spectrum systems—such as those standardized in IS-95, IS-2000 (cdma2000), and the $3^{rd}$-Generation Partnership Project's (3GPP) Wideband Code-Division Multiple Access (W-CDMA) specifications—is the linear interference-whitening (LIW) receiver. LIW receivers suppress interference in addition to collecting signal energy for detection. One form of the LIW receiver is a transversal chip equalizer; another is a G-Rake receiver. The Rake receiver derives its name from its rake-like structure, wherein multiple receiver "fingers" are used to receive multiple signal images in a received multipath signal. By coherently combining the finger outputs in a weighted Rake combiner, the conventional Rake receiver can use multipath reception to improve the Signal to Interference-plus-Noise Ratio (SINR) of the received signal. A Generalized Rake (G-Rake) receiver improves interference suppression performance over a conventional Rake receiver using more sophisticated generation of the combining weights.

Recently, 2×2 Multiple-Input Multiple-Output (MIMO) technology has been standardized in Release 7 of the 3GPP specifications. The standardized scheme, referred to as Dual-Transmit Adaptive Arrays (D-TxAA), is similar to selective per-antenna rate control (S-PARC), except that adaptive unitary precoding is applied to each of the data streams, in this case to each of one or two High-Speed Downlink Shared Channel (HS-DSCH) data streams.

D-TxAA can be viewed as an extension of the previously standardized closed loop mode 1 (CL-1) transmit diversity scheme, in that the precoding vectors (which map a data stream to the multiple transmit antennas) used for each of the D-TxAA data streams are selected from the same codebook used for CL-1. In contrast to CL-1, however, D-TxAA includes two modes of operation—single-stream mode and dual-stream mode. In single-stream mode, one of the four possible precoding vectors from the CL-1 codebook is applied to a single data stream. In dual-stream mode, orthogonal pairs of precoding vectors (again selected from the CL-1 codebook) are applied to the two data streams. The use of precoding has a significant impact on the receiver, and in particular complicates the design of LIW receivers such as Rake receivers.

Earlier versions of the 3GPP W-CDMA specifications (i.e., prior to Release 7) define two transmit diversity modes, CL-1, and an open-loop mode known as STTD. U.S. patent application Ser. No. 10/800,167 (Pub. No. US 2005/0201447), titled "Method and Apparatus for Parameter Estimation in a Generalized Rake Receiver," filed Mar. 12, 2004 by Cairns et al. (the "Cairns application"), assigned to the assignee of the present application and incorporated herein by reference in its entirety, discloses a solution for G-Rake receivers in a transmit diversity system. The solution describes a parametric approach to estimating an impairment covariance matrix used to form G-Rake combining weights. The parametric approach estimates the impairment covariance matrix as a sum of terms, including a separate term for each transmit antenna as well as a term corresponding to the sum of noise plus other-cell interference.

This solution works well for open-loop transmit diversity modes. In an open-loop mode, the impairments corresponding to each transmit antenna during a particular symbol period are uncorrelated, since different symbols are transmitted from the different antennas. In closed-loop mode, however, the mobile terminal specifies a phase offset, and the same symbol is transmitted by a primary antenna and simultaneously by a secondary antenna with the specified phase offset. In this case, the impairment due to each transmit antenna is highly correlated. This correlation may be exploited to improve interference suppression and receiver performance. U.S. patent application Ser. No. 11/751,109, titled "Receiver Parametric Covariance Estimation for Transmit Diversity," filed May 21, 2007 by Jonsson et al. (the "Jonsson application"), assigned to the assignee of the present application and incorporated herein by reference in its entirety, discloses a parametric approach to estimating an impairment covariance matrix that accounts for the simultaneous transmission of the same symbols from a first and second antenna. In this approach the impairment covariance matrix for a system employing two transmit antennas is formulated as a sum of seven terms, including a term corresponding to each of the transmit antennas, a noise-plus-other-cell-interference term, plus four additional terms corresponding to the four possible precoding vectors in the CL-1 codebook. The terms are weighted by fitting parameters determined by fitting the parametrically modeled impairment covariance matrix to a measured impairment covariance matrix. An implicit assumption is that if one or more of the preceding vectors are not used by any user in the cell, then the corresponding fitting parameter will ideally be estimated as zero.

The CL-1 covariance estimation approach described in the Jonsson application applies to the transmission of only a single data stream, mapped according to a precoding vector to two (or more) antennas. In contrast, in D-TxAA, two data streams may be transmitted simultaneously, with both data streams sharing the same set of channelization codes. This creates additional self-interference, referred to as code-reuse interference, which affects the formulation of the impairment covariance. Code reuse is not accounted for in the formulation of the Jonsson application, since only one data stream is ever transmitted in CL-1.

In a co-pending patent application titled "Receiver Parametric Covariance Estimation for Precoded MIMO Transmission," U.S. patent application Ser. No. 12/036,323 (the "Grant application"), the entire contents of which are incorporated by reference herein, a MIMO G-Rake receiver operating at the symbol level is disclosed that is based upon the most general G-Rake formulation for MIMO. For a 2×2 MIMO scenario, this receiver computes an impairment covariance matrix according to:

$$R_u = \alpha_1 R_{11} + \alpha_2 R_{22} + \alpha_{12}^+ R_{12}^+ + j\alpha_{12}^- R_{12}^- \beta R_n, \quad (1)$$

where $R_{11}$ captures the interference due to a first transmit antenna, $R_{22}$ captures the interference due to a second transmit antenna, $R_{12}^+$ and $R_{12}^-$ represent cross-antenna interfer ence, and $R_n$ accounts for white noise passing through the receive filter. The weighting terms are given by:

$$\alpha_1 = \frac{1}{\gamma_p(1)N_p}\left[\Gamma_{D/P}(\gamma_s(1)|b_{11}|^2 + \gamma_s(2)|b_{12}|^2) + \Gamma_{V/P}\sum_{i=1}^{K_v}\gamma_v(i)|v_{1i}|^2 + \gamma_o(1)\Gamma_{O/P} + \gamma_p(1)\right] \quad (2)$$

$$\alpha_2 = \frac{1}{\gamma_p(2)N_p}\left[\Gamma_{D/P}(\gamma_s(1)|b_{21}|^2 + \gamma_s(2)|b_{22}|^2) + \Gamma_{V/P}\sum_{i=1}^{K_v}\gamma_v(i)|v_{2i}|^2 + \gamma_o(2)\Gamma_{O/P} + \gamma_p(2)\right]$$

$$\alpha_{12}^+ = \frac{1}{N_p\sqrt{\gamma_p(1)\gamma_p(2)}}\left[\Gamma_{D/P}(\gamma_s(1)\mathrm{Re}[b_{11}b_{21}^*] + \gamma_s(2)\mathrm{Re}[b_{12}b_{22}^*]) + \Gamma_{V/P}\sum_{i=1}^{K_v}\gamma_v(i)Re[v_{1i}v_{2i}^*]\right]$$

$$\alpha_{12}^- = \frac{1}{N_p\sqrt{\gamma_p(1)\gamma_p(2)}}\left[\Gamma_{D/P}(\gamma_s(1)\mathrm{Im}[b_{11}b_{21}^*] + \gamma_s(2)\mathrm{Im}[b_{12}b_{22}^*]) + \Gamma_{V/P}\sum_{i=1}^{K_v}\gamma_v(i)Im[v_{1i}v_{2i}^*]\right]$$

$$\beta = N_0$$

Here, $N_p$ is the pilot code spreading factor, $\gamma_x(k)$ is the fraction of the total base station chip energy allocated to voice (x=v), data (x=s), overhead (x=o), or pilots (x=p) for antenna/stream k, $\Gamma_{x/P}$ is the ratio of chip energies $E_x/E_p$, $b_{ij}$ is the i,j-th element of pre-coding matrix B, and $v_{ij}$ is the i-th element of the pre-coding vector v for the j-th voice user. Note that in WCDMA, the columns of B and the pre-coding vectors v are drawn from the codebook $\Phi=\{\phi_1,\phi_2,\phi_3,\phi_4\}$, where $\phi_k=[1\ e^{j(2k-1)\pi/4}]^T$ for k=1, 2, 3, 4. The columns of B are chosen from orthogonal pairs of $\Phi$ in dual stream mode, whereas only one pre-coding vector is chosen for the first column of B in single stream mode, while the second column is set to the zero vector ($[0\ 0]^T$).

The G-Rake receiver described in the Grant application utilizes the impairment covariance matrix and net channel estimates to compute combining weights. The combining weights for this receiver structure depend on whether one or two streams are being transmitted. For single stream mode, the combining weights $w^{single}$ are obtained by solving the following system of equations:

$$R_u w^{single} = h(b), \quad (3)$$

where the notation h(b) indicates the "effective" net channel coefficients that depend on the pre-coding vector b. (b is the first column of B as described above for single stream mode.)

For dual stream mode, two sets of combining weights ($w_1^{dual}, w_2^{dual}$) must be computed. These weights may be obtained by solving the following systems of equations $$(R_u + \alpha_{PC}(1)h(b_2)h^H(b_2))w_1^{dual} = h(b_1) \quad (4)$$
$$(R_u + \alpha_{PC}(2)h(b_1)h^H(b_1))w_2^{dual} = h(b_2).$$

Here, $h(b_n)$ is the effective net channel coefficient vector due to pre-coding for stream n, and $\alpha_{PC}(n)$ is a per-code scaling factor that multiplies the outer product of the effective net coefficients to account for the code reuse interference (note: pre-coding vector $b_1$ corresponds to the first column of matrix B while pre-coding vector $b_2$ corresponds to the second column).

Symbol estimates for either single or dual stream mode are obtained by computing the inner product of the combining weights for the given stream with the despread traffic symbols.

As noted above, the MIMO G-Rake receiver formulation disclosed in the Grant application is the most general formulation. However, this solution is quite complex. Four fundamental matrix terms must be computed: $R_{11}, R_{22}, R_{12},$ and $R_n$. (The matrix term $R_{12}$ is used to compute $R_{12}^+$ and $R_{12}^-$ for Equation (1)). Of these fundamental terms, $R_{11}, R_{22},$ and $R_n$ are conjugate symmetric, so only slightly more than half of the matrix elements must be calculated. $R_{12}$, on the other hand, is not conjugate symmetric, so all matrix elements must be computed. Those skilled in the art will appreciate that the calculations required to compute these matrix terms represent a considerable computation burden.

In addition, the formulation of Equation (1) requires that five parameters be estimated to form the impairment covariance matrix. This is compared to the estimation of only two parameters in a "baseline" non-MIMO G-Rake receiver. Even in these simpler receivers, post-estimation smoothing or other adjustment (e.g. clipping) of parameters has been found useful to obtain good overall receiver performance. Joint estimation of five parameters is likely to require similar (and likely even more complex) post-processing to yield good receiver performance.

SUMMARY

A reduced-complexity model-based technique for estimating impairment covariance associated with a MIMO signal is disclosed. In an exemplary method, an impairment model is constructed for a received composite information signal comprising at least a first data stream transmitted from first and second antennas according to a first antenna weighting vector. The impairment model includes first and second model terms corresponding to the first and second antennas, respectively, but in several embodiments omits cross-antenna interference terms. In some embodiments, the first and second model terms are each computed as functions of propagation channel estimates corresponding to the first and second antennas, respectively, and a third impairment model term is computed to account for noise and inter-cell interference. In a variation of this embodiment, the first, second, and third impairment model terms are grouped so that only two scaling parameters associated with the grouped first, second, and third impairment model terms are unknown, and values for the two unknown scaling parameters are estimated by fitting the impairment model to measured impairment covariance values.

In another embodiment, an impairment model for a received MIMO signal is constructed by computing an impairment model term for each antenna and an additional term to account for preceding interference in a single-stream MIMO transmission scenario. The impairment terms are grouped so that only two associated scaling terms are unknown; values for the scaling terms are estimated by fitting the model to measured impairment covariance values.

Another embodiment relates to a wireless communication receiver for use in a mobile terminal in a transmit diversity wireless communication system. The receiver includes a radio front-end circuit configured to provide a received signal of interest containing at least a first data stream transmitted simultaneously from a first and second antenna according to a first antenna weighting vector. The receiver circuit is configured to carry out one or more of the methods described herein for estimating impairment covariance.

DETAILED DESCRIPTION

Figure 1:
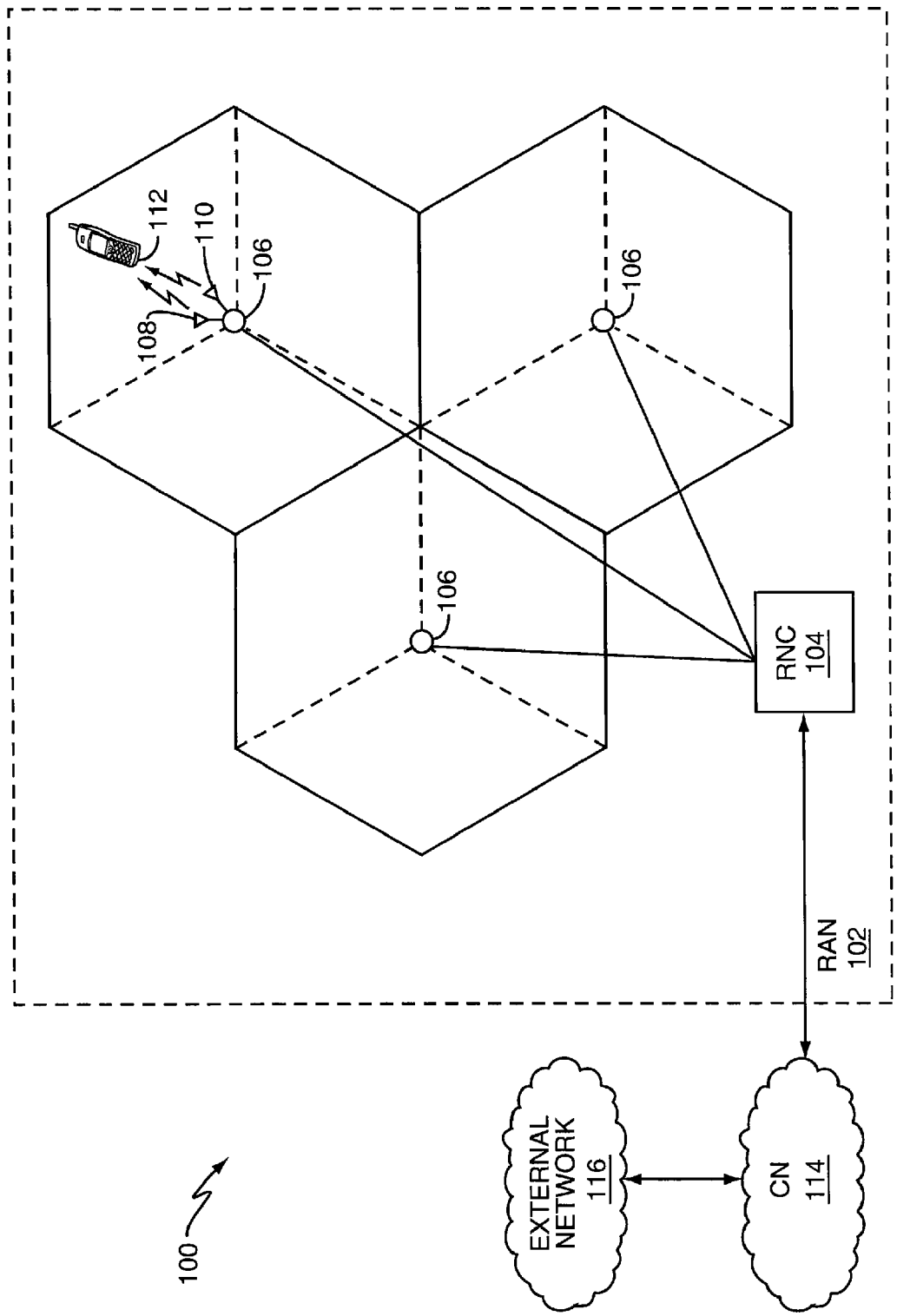
FIG. 1 is a functional block diagram of a wireless communication system.

FIG. 1 depicts an exemplary wireless communication system 100 employing closed-loop transmit diversity, such as CL-1, and/or multiple-input multiple-output (MIMO) transmissions, such as according to the D-TxAA specifications. Within a Radio Access Network (RAN) 102, a Radio Network Controller (RNC) 104 controls a plurality of base transceiver stations (BTS) 106, also known in the art as Node B's. Each Node B 106 provides radio communication services with subscriber mobile terminals 112 within a geographic area called a cell, which may be divided into sectors, as depicted in FIG. 1. The RNC 104 communicates with a Core Network (CN) 114, which in turn is connected to one or more external networks 116, such as the Public Switched Telephone Network (PSTN), the Internet, or the like.

Embodiments of the present invention are described herein with respect to WCDMA standards, including the specifications for D-TxAA, which is more fully described below. However, the invention is not so limited, and the inventive concepts disclosed and claimed herein may be advantageously applied to a wide array of transmit diversity systems.

Figure 2:
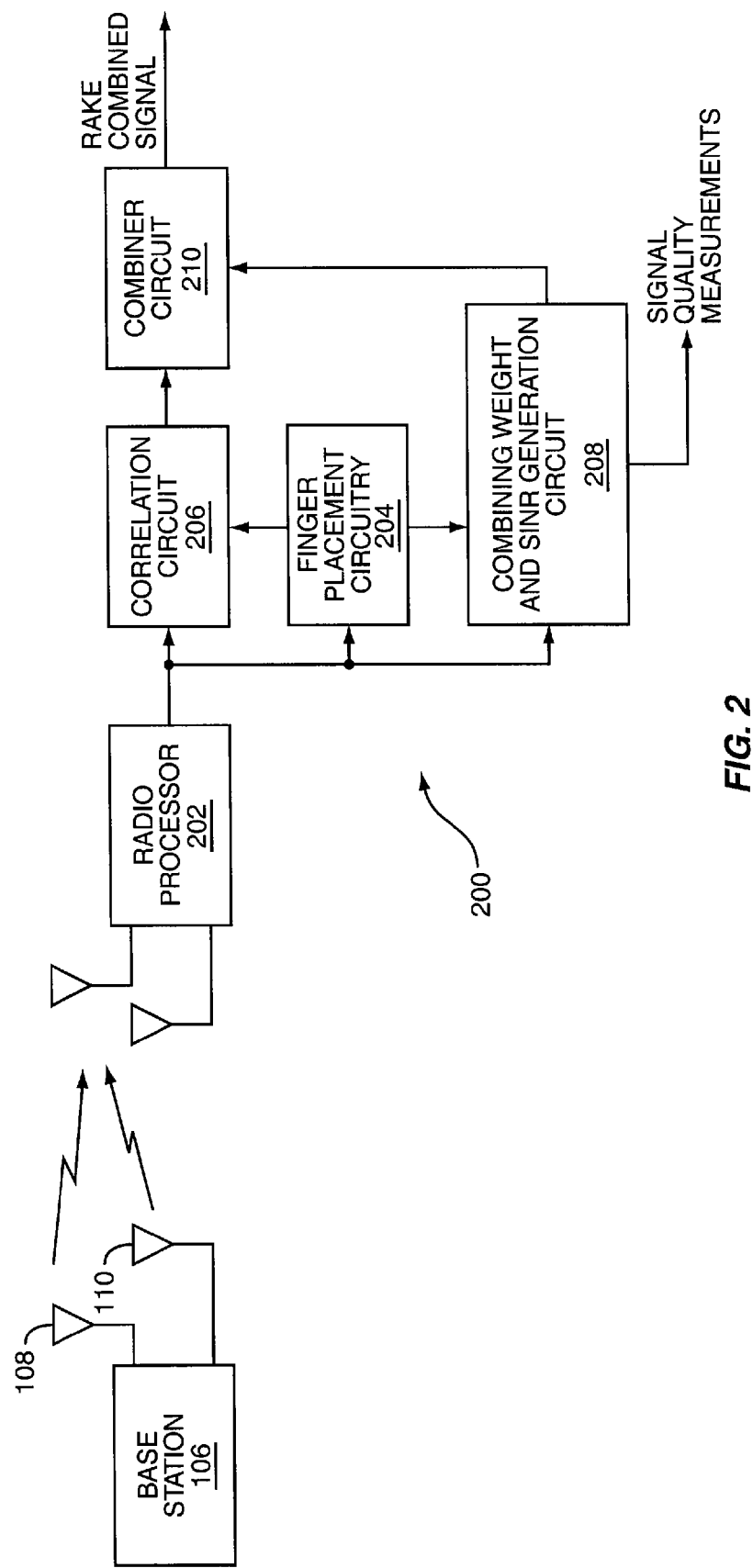
FIG. 2 is a functional block diagram of an exemplary symbol-level LIW receiver configured to process received signals transmitted from at least first and second transmit antennas.

Each base station 106 includes at least a primary transmit antenna 108 and a secondary transmit antenna 110 (either per-cell or per-sector, depending on the network 100 configuration), as shown in FIG. 2. The base station 106 may transmit an information signal, such as a precoded voice signal or a precoded High-Speed Downlink Packet Access (HSDPA) data signal using both antennas 108, 110. The signal transmitted on the secondary antenna 110 is weighted relative to the signal transmitted on the primary antenna 108, wherein the transmit weights may comprise phase offset only, or may more generally comprise a complex quantity having both phase and amplitude. The phase shift employed may be determined by feedback from the mobile terminal 112, thus forming a closed-loop transmit diversity system.

There are two main types of LIW receiver architectures. One uses symbol-level equalization, which is typically based on maximum likelihood estimation techniques. This type of receiver includes the G-Rake receiver 200, illustrated in block diagram form in FIG. 2. A radio processor 202 generates chip samples from a received signal, which includes the information signal transmitted from antennas 108 and 110 at base station 106. The chip samples are provided to a finger placement circuit 204, which determines the "finger delays," usually including multipath delays, used to despread a received CDMA signal in a correlation unit 206. The finger delays are also provided to a weight computer 208 that computes combining weights which are used to combine the despread values in a combiner 210 to produce soft values, or estimates of the symbol values.

Figure 3:
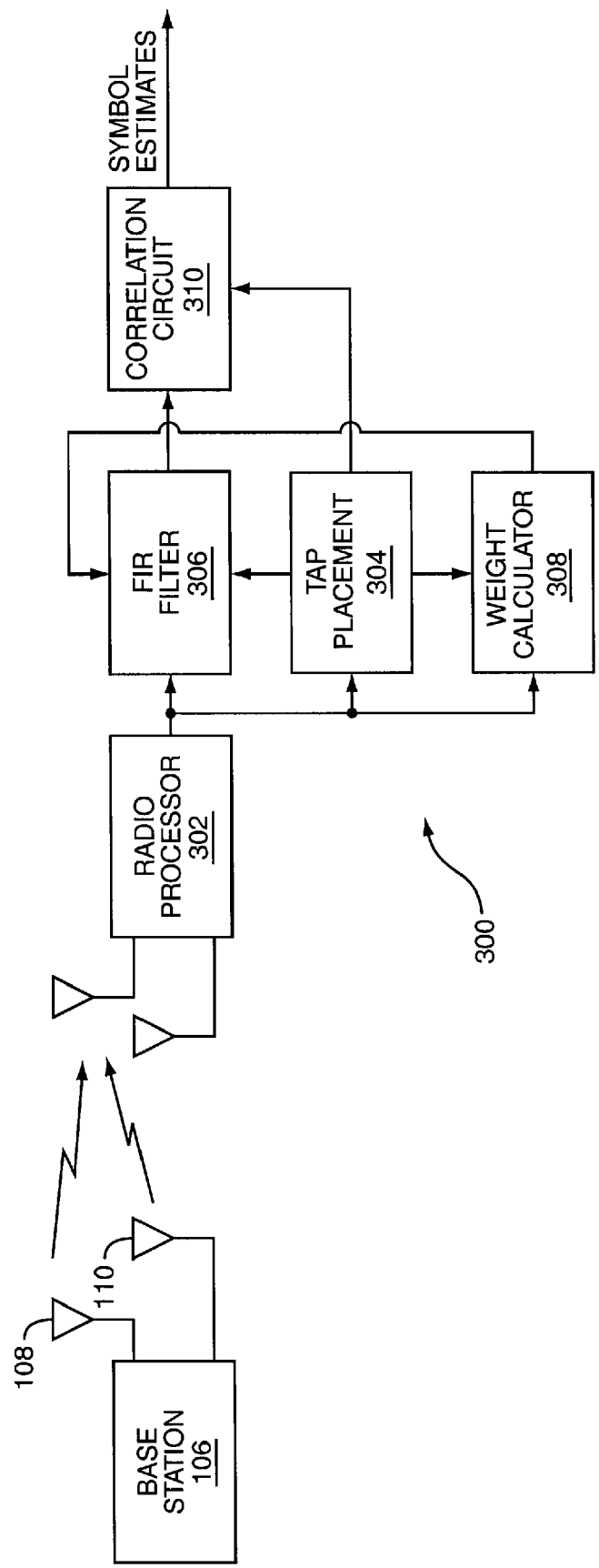
FIG. 3 is a functional block diagram of an exemplary chip-level LIW receiver configured to process received signals transmitted from at least first and second transmit antennas.

Another type of LIW receiver is a chip-level equalizer, which typically includes Minimum Mean-Square Error (MMSE) transversal chip equalization 300, as illustrated in block diagram form in FIG. 3. A radio processor 302 generates chip samples from a received signal. The chip samples are provided to a tap placement circuit 304, which determines the tap delays, related to multipath delays, for a Finite Impulse Response (FIR) filter 306. The selected tap delays are also provided to a weight calculator 308 that computes filter coefficients (or weights) for the FIR filter 306. The FIR filter 306 filters the chip samples to produce a signal that is despread by a correlator 310 to produce symbol estimates.

Both types of LIW receivers 200, 300 rely on an estimate of a covariance matrix. In the case of maximum likelihood G-Rake processing, the covariance matrix is an impairment covariance matrix. In the case of MMSE-based processing, a data covariance matrix, which is closely related to the impairment covariance matrix, is used. According to embodiments described herein, an impairment model is constructed, the impairment model generally including several model terms scaled by corresponding scaling parameters. As will be shown below, the model terms may be constructed so that each is independent of antenna weighting vectors (preceding vectors) used for transmitting the information signals. Effects of the antenna weighting vectors are captured by the scaling parameters. The scaling parameters may be calculated, in some embodiments, or may be jointly estimated ("fitted") according to well-known techniques by fitting the impairment model to measured impairment covariance or data covariance matrices. For convenience, this process is described with respect to a G-Rake receiver and an impairment covariance matrix. However, the use of a data covariance matrix in the case of a chip equalizer is directly analogous.

Figure 4:
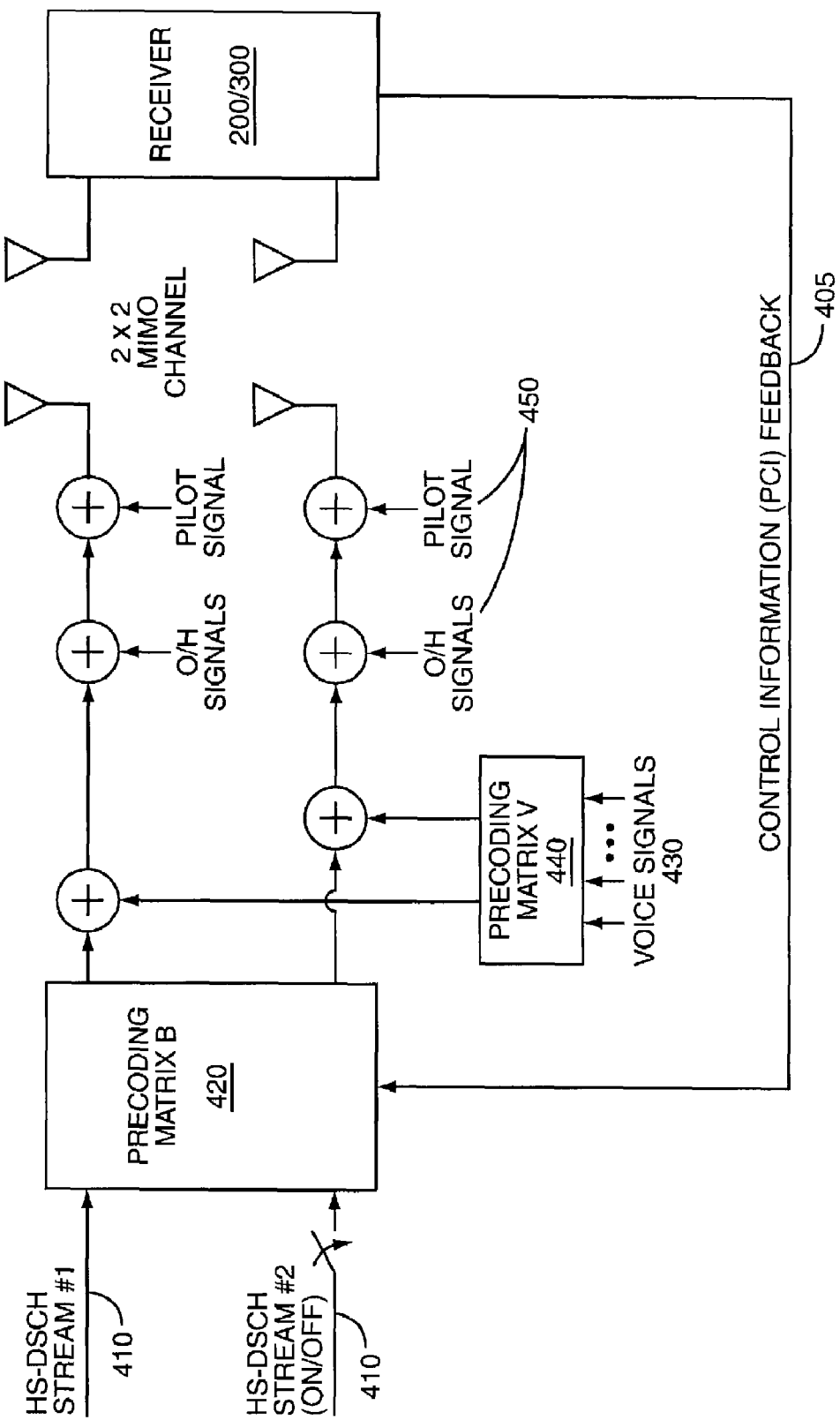
FIG. 4 is a block diagram illustrating the composition of a transmitted signal.

In order to provide context for a detailed discussion of impairment models, additional background of the D-TxAA MIMO scheme standardized by 3GPP in Release-7 High-Speed Packet Access (HSPA) specifications is provided here. A high-level view of the scheme is shown in FIG. 4. In Release-6 (non-MIMO) HSPA, the theoretical maximum downlink data rate is 14.4 Mbps which is achieved using 15 codes, 16-QAM, and coding rate 1. With D-TxAA, this peak rate may doubled to 28.8 Mbps by transmitting a second, separately encoded data stream in parallel, when channel conditions warrant. Typically, this occurs at high signal-to-noise ratios (SNRs) and when the channel is full rank. In rank-deficient scenarios and/or lower SNRs, the second data stream may be switched off, as indicated in the figure, so that only a single HSPA data stream is transmitted.

D-TxAA uses a form of unitary precoding applied to the HS-DSCH data streams using the preceding weight matrix B. The weight vectors (columns of B) applied to each stream are drawn from the same codebook of four phase-only weights used for the closed-loop mode-1 (CL-1) transmit diversity option defined in Rel-99:

$$u_i = \frac{1}{\sqrt{2}} \begin{bmatrix} 1 \\ e^{j\frac{\pi}{4}(2i-1)} \end{bmatrix}, i = 1, 2, 3, 4. \tag{5}$$

Those skilled in the art will appreciate that while phase-only weights are used in D-TxAA as currently standardized, MIMO transmission more generally may use amplitude weighting as well. Further, the codebook from which the weight vectors are drawn is by no means limited to four entries.

In any event, for the case of single-stream D-TxAA transmission, the weight vector is a single one of the four possible vectors in the CL-1 codebook. For the case of dual-stream transmission, the two used weight vectors are selected to be orthogonal; hence, B is unitary. With respect to the CL-1 codebook as defined in Equation (1), the orthogonal pairings are thus (1,3) and (2,4) and permutations thereof.

With this structure, there are fundamentally eight different transmitter modes corresponding to the different choices for B and the different modes—4 single-stream modes and 4 dual-stream modes. The single-stream modes are defined by $$B \in \{[u_1\ 0],[u_2\ 0],[u_3\ 0],[u_4\ 0]\} \quad (6)$$

and the dual-stream modes by $$B \in \{[u_1\ u_3],[u_2\ u_4],[u_3\ u_1],[u_4\ u_2]\}. \quad (7)$$

A selection of the "best" transmitter mode is made by the user equipment (UE) through maximizing some metric such as data rate, SINR, received power per-stream, or the like. The UE indicates its preferred precoding configuration through feedback, called precoding control information (PCI), transmitted to the Node B on the high-speed dedicated physical control channel (HS-DPCCH), as shown in FIG. 4. The PCI feedback 405 informs the scheduler in the Node B of the preferred number of data streams and the preferred precoding weight vector(s). The Node B signals the actually used precoding matrix B, as well as the actually transmitted number of streams, on the downlink high-speed shared control channel (HS-SCCH). This information is used to configure the receiver in the UE.

As can be seen in FIG. 4, a number of different signals form the composite transmitted signal on each antenna. These include the following: the one or two high-speed downlink shared channel (HS-DSCH) data streams 410 which are precoded, using matrix B, at block 420; a number of dedicated channel signals (e.g., voice and/or control), including voice signals 430, which may be configured using CL-1 transmit diversity using the matrix V at block 440; and a number of other overhead signals 450 (e.g., pilots, voice, control, etc.) that are not precoded. The precoding matrix V is given by $$V=[v_1 v_2 \ldots v_{K_v}], \quad (8)$$

where $K_v$ is the number of dedicated channels configured in CL-1 transmit diversity. Each precoding vector (column of V) is given by one of the 4 possible vectors in the CL-1 codebook.

It is important to note that when the transmitter is configured in dual-stream mode, the same set of channelization (spreading) codes is used for both streams. This creates self-interference that must be resolved by the receiver. In other words, when the receiver demodulates each stream, it must suppress interference from the other stream.

Various embodiments of the present invention exploit a new way of expressing the covariance term associated with a given precoded signal. In particular, the MIMO G-Rake receiver described in the Grant application may be simplified, reducing the number of terms required to estimate the impairment covariance matrix, and simplifying estimation of scaling parameters applied to the impairment covariance matrix terms to produce an impairment covariance matrix estimate. The presently disclosed techniques thus significantly reduce complexity compared to previous solutions.

If it is assumed that the overhead signals are uniformly distributed across antennas and that the voice signals are not pre-coded (i.e. $v_i=[1\ 0]^T$), it can be shown that Equation (1) may be simplified considerably. In fact, these assumptions have been shown to have very little impact on receiver performance under a range of conditions. Because the simplifications are mode-specific, the two D-TxAA modes are considered separately below.

First, 3GPP's WCDMA Release 7 specifications specify that, for dual stream MIMO, the data signal power is evenly split between the two streams, and that the pre-coding vectors $b_1$ and $b_2$ are orthogonal. Using these facts and the assumptions above, the impairment covariance matrix for two stream mode may be given by:

$$R_u = (\Gamma_{O/P} + \Gamma_{D/P})\left(\frac{1}{2N_p\gamma_p(1)}R_{11} + \frac{1}{2N_p\gamma_p(2)}R_{22}\right) + \quad (9)$$

$$\frac{1}{N_p}(R_{11}+R_{22}) + \beta R_n.$$

Those skilled in the art will immediately appreciate that the formulation of Equation (9) omits any cross-antenna terms. Furthermore, the model terms $R_{11}$, $R_{22}$, and $R_n$ are independent of the precoding vectors $b_1$ and $b_2$. The functional forms for the terms $R_{11}$, $R_{22}$, and $R_n$ are given in the Cairns and Jonsson applications discussed above.

Although the impairment terms $R_{11}$, $R_{22}$, and $R_n$ can be grouped in various ways, the grouping of Equation (9) is particularly advantageous, as Equation (9) can also be written as:

$$R_u = \mu(k_1 R_{11}+k_2 R_{22})+k_3(R_{11}+R_{22})+\beta R_n, \quad (10)$$

where $k_n$ indicates a constant value that is known a priori by the receiver, and $\mu$ and $\beta$ are unknown quantities that the receiver must estimate. Those skilled in the art will appreciate that three conjugate symmetric matrix terms must be computed, while only two parameters must be estimated. This represents a considerable computation savings over the more general formulation described in the Grant application. Those skilled in the art will also appreciate that performance advantages may also be anticipated, since only two parameters must be estimated.

For single-stream mode, the impairment covariance matrix is given by:

$$R_u = \Gamma_{O/P}\left(\frac{1}{2N_p\gamma_p(1)}R_{11} + \frac{1}{2N_p\gamma_p(2)}R_{22}\right) + \quad (11)$$

$$\frac{1}{N_p}(R_{11}+R_{22}) + \Gamma_{D/P}\left(\frac{1}{2N_p}R_{\mathit{eff}}(b)\right) + \beta R_n$$

This can also be written as:

$$R_u = \mu_1(k_1 R_{11}+k_2 R_{22})+k_3(R_{11}+R_{22})+\mu_2(k_4 R_{\mathit{eff}}(b))+\beta R_n, \quad (12)$$

where $k_n$ again indicates a constant value that is known a priori by the receiver, and $\mu_1$, $\mu_2$, and $\beta$ are unknown quantities that the receiver must estimate. The term $R_{\mathit{eff}}(b)$ represents the interference due to pre-coding. This term is calculated in a similar fashion to $R_{11}$ and $R_{12}$, except that the medium coefficients used for the computation are "effective" medium coefficients given by $$g^{eff} = \sum_{m=1}^{N} \sqrt{\frac{\gamma_p(1)}{\gamma_p(m)}} b_m g_m, \quad (13)$$

where $g_m$ is a composite medium coefficient vector corresponding to the $m^{th}$ transmit antenna and $b_m$ is the $m^{th}$ element of the pre-coding vector b. Note that $g_m$ contains the stacked contributions of the medium coefficients corresponding to the propagation channel between the $m^{th}$ transmit antenna and the $l^{th}$ receive antenna ($g_m=[g_{m1}^T g_{m2}^T \ldots g_{mL}^T]^T$).

Advantages of this approach and the grouping of terms above are that only four conjugate symmetric matrix terms ($R_{11}$, $R_{22}$, $R_{eff}(b)$, and $R_n$) must be computed for single-stream mode, and only three parameters must be estimated. This formulation also represents a considerable computational savings, and the overall receiver performance is better since only three parameters must be estimated. In addition, the single-stream formulation of Equation (12) can be simplified further by dropping the $R_{eff}(b)$ term, (making it identical to the dual-stream formulation), yielding additional complexity reduction while sacrificing little in terms of overall receiver performance.

Figure 5:
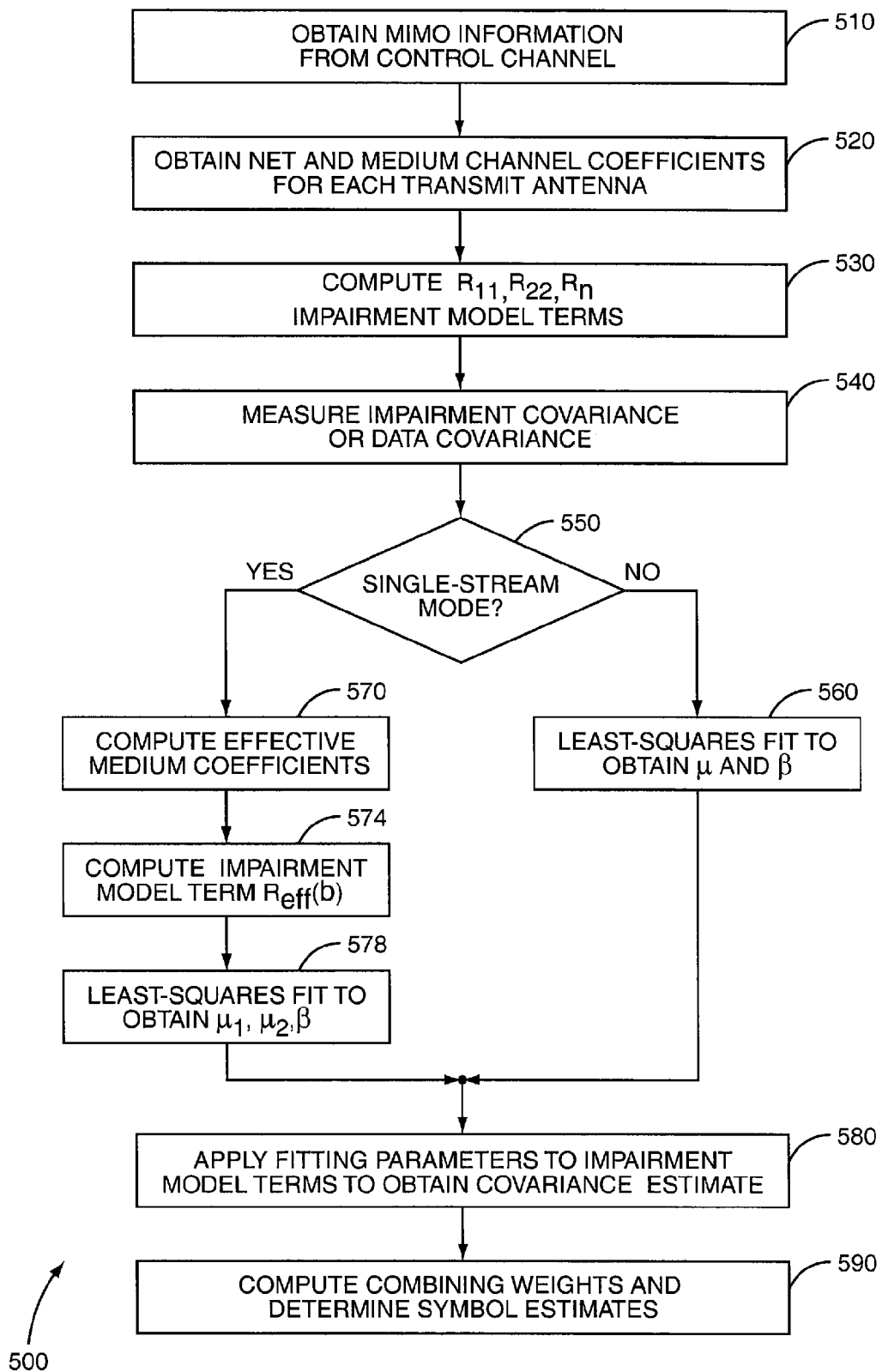
FIG. 5 is a flow diagram of an exemplary method of estimating impairment covariance of a received signal of interest.

FIG. 5 illustrates an exemplary method for estimating and applying impairment covariance according to one or more embodiments of the present invention. Method 500 can be viewed as a direct implementation of equations (9) and (11).

Method 500 begins at block 510, with the obtaining of MIMO information, which may include a MIMO mode (e.g., single-stream or dual-stream) and pre-coding vector(s) (b or B, depending on the mode), the allocation of pilot channel power across antennas ($\gamma_p(1)$ and $\gamma_p(2)$), the allocation of data power across streams ($\gamma_d(1)$ and $\gamma_d(2)$), and the number of spreading codes used (K). Those skilled in the art will appreciate that Equations (9) and (11) are based on an assumption that data signal power is evenly split between the streams. Thus, in some embodiments, this even split (e.g., $\gamma_d(1)=\gamma_d(1)=0.5$) may simply be assumed. In others, a receiver may selectively employ method 500, based on the known or estimated values for $\gamma_d(1)$ and $\gamma_d(2)$.

At block 520, net and medium channel coefficients are obtained for each transmit antenna. Techniques for estimating these coefficients, including techniques based on pilot channel measurements, are well known in the art. In one embodiment, the measured net channel response $h_m$ is obtained from measurements of de-spread pilot symbols by:

$$h_m = \frac{1}{N_P} \sum_{k=0}^{N_P-1} x_{pilot,m}(k) s_m^*(k), \quad (14)$$

where $X_{pilot,m}(k)$ is the vector of de-spread pilot symbols for the k-th symbol corresponding to the m-th transmit antenna in the current slot, $s_m^*(k)$ is the complex conjugate of the known value for the k-th pilot symbol corresponding to the m-th transmit antenna, and $N_P$ is the number of symbols used in the measurement. Once $h_m$ has been derived from pilot symbol measurements, corresponding estimates for the medium channel response may be calculated, according to:

$$g_m=(A^H A)^{-1} A^H h_m, \quad (15)$$

where A is an M×L (corresponding to M receiver fingers and L multipath delays; M≧L) conversion matrix that incorporates information characterizing the transmitter and receiver contributions to the composite, or net, channel response. The (i,j) element of A is thus given by:

$$a_{i,j}=R_{TX/RX}(d_i-\tau_j). \quad (16)$$

Here, $R_{TX/RX}(\lambda)$ is the convolution of the transmit and receive filters evaluated at $\lambda$, $d_i$ is the delay of the i-th receiver finger, and $\tau_j$ is the j-th path delay.

At block 530, the impairment model terms $R_{11}$, $R_{22}$, and $R_n$ are computed, based on the medium channel response values $g_m$. The functional form of $R_{11}$ and $R_{22}$ was given in the Cairns and Jonsson applications discussed above, and depends on the pulse shape autocorrelation function as well as the medium response channel estimates. Elements in these matrices correspond to pairs of fingers. For example, for finger $f_1$ (associated with delay $d_{f_1}$ and receive antenna $l_1$) and for finger $f_2$ (associated with delay $d_{f_2}$ and receive antenna $l_2$), the corresponding matrix element of $R_{mm}$ (m is equal to 1 or 2) is given by $$r_{m,m}(f_1, f_2) = \sum_{p_1=0}^{P-1} \sum_{p_2=0}^{P-1} g_m(p_1, l_1)(g_m(p_2, l_2))^* \cdot \sum_{\substack{k=-\infty \\ k \neq 0}}^{\infty} x(d_{f_1} - \tau_{p_1} - kT_c) x^*(d_{f_2} - \tau_{p_2} - kT_c), \quad (17)$$

where P is the number of paths, $g_m$ (p,l) is the medium response channel coefficient that is associated with receive antenna l and path delay $\tau_p$, $x(\tau)$ is the chip pulse shape autocorrelation function, and $T_c$ is the chip period.

At block 540, impairment covariance or data covariance is measured, to provide an "instantaneous" estimate of the signal impairments. Those skilled in the art will appreciate that whether impairment covariance or data covariance is measured will depend on the receiver implementation. Typically, a G-Rake receiver is configured to perform impairment covariance measurements using pilot channel data. Measured data covariance can be obtained by summing outer products of several sample data vectors (vector elements corresponding to finger outputs), i.e.:

$$\tilde{R}_{measured} = \sum_n y(n) y^H(n), \quad (18)$$

where n is a time index and y(n) is a vector of de-spread pilot values corresponding to time index n.

If the current transmission mode is dual-stream, as determined at block 550, then the three impairment model terms $R_{11}$, $R_{22}$, and $R_n$ provide an adequate basis for modeling the signal impairments. In this case, then, the procedure continues immediately at block 560 with estimating values for only two scaling values, $\mu$ and $\beta$, in accordance with Equation (10). In some embodiments, the scaling values $\mu$ and $\beta$ are "fitted" so that the fitted estimates $\hat{\mu}$ and $\hat{\beta}$ satisfy the expression:

$$\tilde{R}_{measured} - k_3(R_{11}+R_{22}) = \hat{\mu}(k_1 R_{11}+k_2 R_{22}) + \hat{\beta} R_n. \quad (19)$$

(A corresponding fitting expression may be readily derived by those skilled in the art for fitting the impairment terms to measured data covariance, where the fitting equation includes an additional term corresponding to the outer product of the net channel response). As can easily be seen by comparing Equations (9) and (10), $$k_1 = \frac{1}{2N_p\gamma_p(1)}, k_2 = \frac{1}{2N_p\gamma_p(2)}, \text{ and } k_3 = \frac{1}{N_p},$$

each of which can be easily calculated from known values. A least-squares or other approach may be used to fit the weighted sum of terms in Equation (19) to the measured covariance, where equations with complex quantities are treated as two real-value equations, as described in the Cairns application. Clipping of values at zero may be used, as well as other clipping procedures. The instantaneous values of the fitting parameters $\hat{\mu}$ and $\hat{\beta}$ may additionally be smoothed, or filtered, to reduce the effects of transient channel conditions.

If, on the other hand, the current transmission is single-stream, then an additional impairment model term may be computed to account for interference caused by precoding. Thus, at block 570, "effective" medium coefficients $g^{eff}$ are computed, from the medium channel coefficients obtained at block 520 and the preceding vector b currently in use, according to Equation (13). The effective medium coefficients are used at block 574 to compute an impairment model term $R_{eff}$(b), which has the same form as $R_{11}$ and $R_{22}$, but is instead a function of $g^{eff}$ rather than $g_1$ or $g_2$. Then, at block 578, values for three scaling terms, $\mu_1$, $\mu_2$, and $\beta$, are estimated, in accordance with Equation (12). Accordingly, in some embodiments, fitting parameter values $\hat{\mu}_1$, $\hat{\mu}_2$, and $\hat{\beta}$ are jointly estimated so that:

$$\tilde{R}_{measured} - k_3(R_{11}+R_{22}) \approx \hat{\mu}_1(k_1 R_{11}+k_2 R_{22})+\hat{\mu}_2(k_4 R_{eff}(b))+\hat{\beta}R_n. \quad (20)$$

As was the case with the dual-stream expression, $k_1$, $k_2$, and $k_3$ are based on known quantities. In addition, $k_4$ is known, i.e.

$$k_3 = \frac{1}{2N_p},$$

but can in any event be accounted for in the estimation of $\hat{\mu}_2$. The values for $\hat{\mu}_1$, $\hat{\mu}_2$, and $\hat{\beta}$ may be estimated using known techniques, e.g., the least-squares approach discussed above, and may optionally be smoothed or filtered based on successive estimated values.

Once the scaling parameters (two, in the case of dual-stream mode, or three, in the case of single-stream mode) are estimated, they may be applied to the impairment model terms to obtain a parametric estimate of impairment covariance matrix ($\hat{R}_u$), according to Equation (10) or (12), as shown at block 580. At block 590, the estimated impairment covariance may be used to compute combining weights and determine symbol estimates.

Computing combining weights begins with calculating effective net channel estimates. For single stream, the effective net channel estimates $\hat{h}(b)$ can be computed as:

$$\hat{h}(b) = \sum_{m=1}^{N} b_m \hat{h}_m. \quad (21)$$

For dual stream:

$$\hat{h}(b_k) = \sum_{m=1}^{N} b_{mk} \hat{h}_m, \text{ for } k = 1, 2. \quad (22)$$

For single-stream mode, combining weights may be calculated by solving:

$$\hat{R}_u w^{single} = \hat{h}(b). \quad (23)$$

An iterative approach (Gauss-Seidel, conjugate gradient) or exact approach (LU, QR, Cholesky, etc.) may be used.

For dual-stream mode, per-code scaling terms are first computed via:

$$\hat{\alpha}_{PC}(n) = \frac{1}{K}\left(\frac{SF_{data}}{SF_{pilot}}\right)\left(\frac{\gamma_s(n)}{\gamma_p(1)}\right)\Gamma_{D/P}, \text{ for } n = 1, 2. \quad (24)$$

$\Gamma_{D/P}$ may be obtained by explicit signaling from the serving Node B, or by estimation. Given the per-code scaling, two sets of combining weights that account for cross-stream interference may be computed by solving:

$$\hat{R}_{stream1} w_1^{dual} = \hat{h}(b_1)$$

$$\hat{R}_{stream2} w_2^{dual} = \hat{h}(b_2), \quad (25)$$

where $\hat{R}_{stream1} = \hat{R}_u + \hat{\alpha}_{PC}(1)\hat{h}(b_2)\hat{h}^H(b_2)$ and $\hat{R}_{stream2} = \hat{R}_u + \hat{\alpha}_{PC}(2)\hat{h}(b_1)\hat{h}^H(b_1)$ represent the cross-stream interference at the first stream by the second stream, and at the second stream by the first stream, respectively.

The combining weight equations may be solved directly using iterative or exact approaches, or a two-step process can be employed, in which $$\hat{R}_u v_1^{dual} = \hat{h}(b_1)$$

$$\hat{R}_u v_2^{dual} = \hat{h}(b_2) \quad (26)$$

are solved to obtain intermediate weights $v_1^{dual}$ and $v_2^{dual}$. The final weights are computed according to:

$$w_1^{dual} = v_1^{dual} - v_2^{dual}\left(\frac{\hat{\alpha}_{PC}(2)(v_2^{dual})^H \hat{h}(b_1)}{1 + \hat{\alpha}_{PC}(2)(v_2^{dual})^H \hat{h}(b_2)}\right)$$

$$w_2^{dual} = v_2^{dual} - v_1^{dual}\left(\frac{\hat{\alpha}_{PC}(1)(v_1^{dual})^H \hat{h}(b_2)}{1 + \hat{\alpha}_{PC}(1)(v_1^{dual})^H \hat{h}(b_1)}\right). \quad (27)$$

The combining weights may then be used to detect and demodulate the transmitted symbols. The estimated covariance may also be used, for example, to estimate channel quality, i.e., to estimate or predict signal-to-noise-plus-interference or other channel quality metric. Periodically, such as at every WCDMA time slot, the process may be repeated, to dynamically adapt the covariance estimate to changing channel conditions and interference profiles.

The techniques described above may be adapted slightly to facilitate the estimation of SINR or other channel quality metrics for signal transmission scenarios other than a scenario currently employed, i.e. for a projected transmission scenario. Similarly, the techniques may be used to estimate SINR for projected transmission scenarios even when the mobile station is not scheduled for downlink transmissions at all. For example, $R_{stream1}$ and $R_{stream2}$ as estimated above correspond to a particular active transmission scenario (dual-stream) using a particular set of precoding vectors ($b_1$ and $b_2$). For Channel Quality Indicator (CQI) estimation purposes, the receiver may typically consider a number of transmitter modes that differ from the currently used mode. For instance, the current mode may be one of the four possible dual-stream modes shown in Equation (3); however, the receiver must also prepare a CQI report for one or more of the four possible single-stream modes shown in Equation (2). Such a requirement occurs in Release 7 of the UMTS standard, where the user equipment (UE) is required to periodically prepare single-stream CQI reports (referred to as Type B reports), regardless of what the UE's preferred mode is.

Those skilled in the art will appreciate that the impairment covariance model derived above for dual-stream mode (Equation (10)) is independent of the precoding vectors $b_1$ and $b_2$. As noted above, this same model may also be applied to single-stream modes, with some sacrifice in accuracy. As a result, an impairment covariance estimate obtained using the techniques described herein may be used to produce CQI estimates for any of the possible dual-stream or single-stream modes.

In one embodiment, an estimate for impairment covariance obtained, for example, according to:

$$\hat{R}_u = \hat{\mu}(k_1 R_{11} + k_2 R_{22}) + k_3(R_{11} + R_{22}) + \hat{\beta} R_n \quad (28)$$

may be used with effective net response coefficients $\tilde{h}(b)$ calculated for the target mode to estimate signal-to-noise-plus-interference (SINR) for the target mode. Thus, SINR for a target single-stream mode may be estimated according to:

$$\text{SINR} = (\tilde{h}(b))^H \hat{R}_u^{-1} \tilde{h}(b) = w^H \tilde{h}(b). \quad (29)$$

In this embodiment, the term $R_{\it eff}(b)$ may be ignored. For dual-stream mode:

$$\text{SINR}_{stream1} = (\tilde{h}(b_1))^H \hat{R}_{stream1}^{-1} \tilde{h}(b_1) = (w_1^{dual})^H \tilde{h}(b_1)$$

$$\text{SINR}_{stream2} = (\tilde{h}(b_2))^H \hat{R}_{stream2}^{-1} \tilde{h}(b_2) = (w_2^{dual})^H \tilde{h}(b_2), \quad (30)$$

where $R_{stream1}$ and $R_{stream2}$ are calculated as above according to the preceding matrix B for the projected mode.

If the quantity $\Gamma_{D/P}$ (the ratio of data energy to pilot energy across all antennas) is known or can be estimated, then another method may be used for determining CQI for projected transmission modes. If the impairment covariance is estimated for a single-stream mode, for example, then the estimate includes a term $$\Gamma_{D/P}\left(\frac{1}{2N_p} R_{\it eff}(b_{actual})\right),$$

where $b_{actual}$ represents the precoding vector for the currently scheduled mode. Because both $\Gamma_{D/P}$ and $N_p$ are known, this term can be calculated and removed (i.e., subtracted) from the overall impairment covariance estimate. Then, a new covariance estimate and associated SINR may be calculated for any projected transmission mode. For a single-stream mode, the projected impairment covariance is then:

$$R_{u\_projected} = \quad (31)$$
$$\hat{R}_u - \Gamma_{D/P}\left(\frac{1}{2N_p} R_{\it eff}(b_{actual})\right) + \Gamma_{D/P}\left(\frac{1}{2N_p} R_{\it eff}(b_{projected})\right),$$

where $R_u$ is the estimated covariance for a currently scheduled single-stream mode employing precoding vector $b_{actual}$, and $b_{projected}$ is the precoding vector for a proposed, or projected single-stream mode. Those skilled in the art will immediately appreciate that SINR may be calculated for any desired mode using this general approach.

Figure 6:
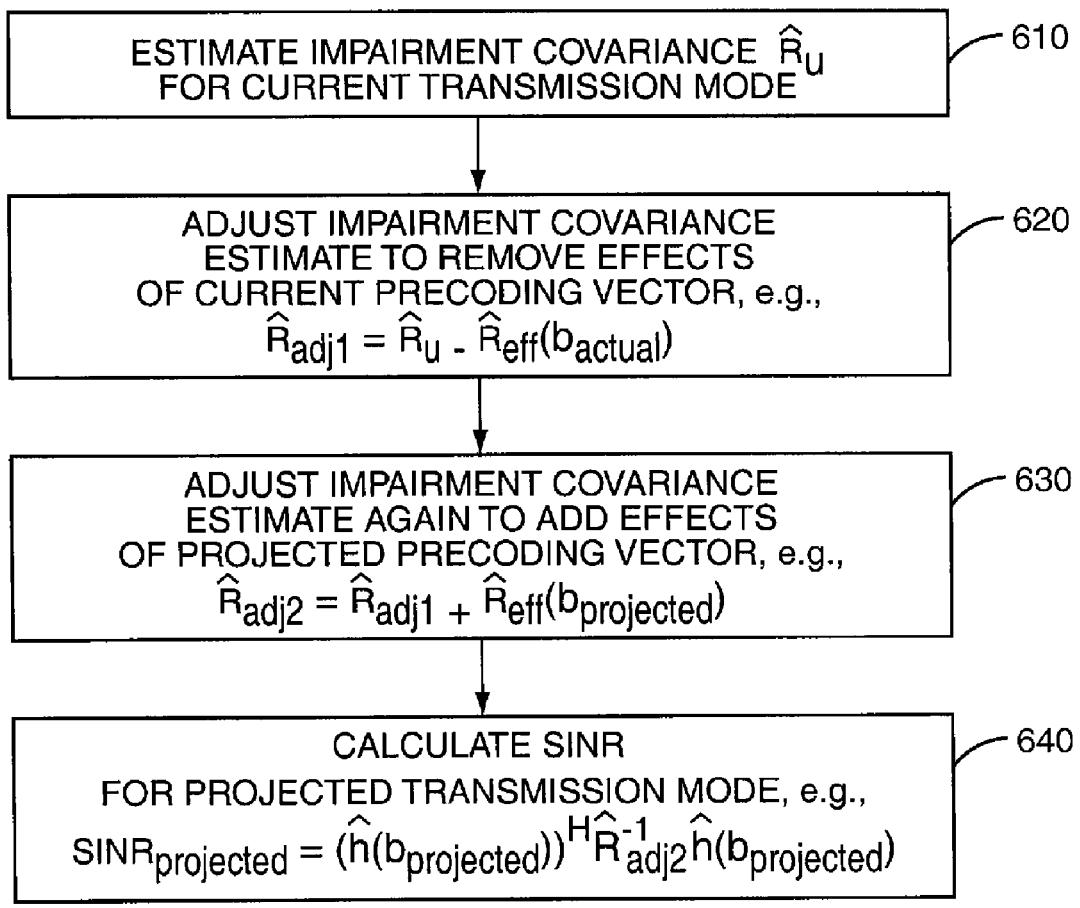
FIG. 6 is a flow diagram of an exemplary method for estimating channel quality, e.g. SINR.

Accordingly, an exemplary method for estimating SINR for one or more projected transmission modes is illustrated in FIG. 6, and begins at block 610 with an estimated impairment covariance for a current mode. The estimated impairment covariance is adjusted at block 620 to remove the effects (if any) of a preceding vector corresponding to the current mode, and adjusted again at block 630 to add back in the effects of one or more preceding vectors corresponding to a projected transmission. The adjusted impairment covariance estimate is then used at block 640 to calculate a projected SINR for the projected transmission mode according to conventional techniques.

Although described herein in terms of own-cell interference, the present invention may be applied using additional model terms to model other-cell interference. For example, a single other-cell covariance term per dominant interfering base station may be added to equation (10) or (12), as described in the Cairns application. Additionally or alternatively, multiple covariance terms may be added to account for transmit diversity being used in other cells. Soft handoff may be handled, again as described in the Cairns application. Although described herein in terms of downlink reception, the present invention may be applied in the uplink as well.

Embodiments of the present invention thus provide a reduced-complexity method for MIMO interference suppression for both symbol-level (G-Rake) and chip-level (chip equalizer) LIW receivers, which are the two main architectures for advanced receivers in WCDMA systems. Those skilled in the art will appreciate that the particular design of a LIW receiver in accordance with the inventive techniques, and the associated nomenclature used in connection with such a receiver, may vary according to the network standard involved, but such variations are not germane to understanding or explaining the present invention. Moreover, it should be understood that the networks and radio devices illustrated and discussed herein are simplified; actual implementations likely will have additional entities omitted herein for clarity.

Nevertheless, an exemplary mobile terminal 112 includes one or both of the exemplary receiver circuits 200 or 300, illustrated in FIGS. 2 and 3, respectively. These receiver circuits may be implemented using various processing circuits, including A/D converters, filters, DSPs or other digital processors, memory, and the like. In at least one exemplary embodiment, mobile terminal 112 includes one or more DSPs and/or Application Specific Integrated Circuts (ASICS) or other programmable devices to implement receiver 112 including a G-Rake receiver as illustrated in FIG. 2. The processing circuits may be configured to include processing logic to carry out one or more of the methods described herein. It should thus be understood that at least a portion of the present invention's functionality may be embodied as stored computer instructions in the form of micro-code, firmware, software, etc.

More generally, the present invention can be implemented in hardware, software, or essentially any combination thereof, according to the needs of a particular design. Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of estimating impairment covariance associated with a first received composite information signal comprising at least a first data stream transmitted from first and second antennas according to a first antenna weighting vector, the method comprising:
   constructing a first impairment model comprising at least first and second model terms corresponding to the first and second antennas respectively, wherein the model terms capture propagation channel effects and are independent of the first antenna weighting vector, and wherein the first impairment model omits cross-antenna interference terms; and
   computing a first parametric estimate of the impairment covariance, using the first impairment model, by calculating the first and second model terms as a function of propagation channel estimates corresponding to the first and second antennas, respectively, measuring impairment covariance or data covariance associated with the received composite information signal, and estimating values for two or more unknown parameters of the first impairment model using the measured impairment covariance or data covariance and the computed first, second, and third model terms.

2. The method of claim 1, wherein constructing the first impairment model comprises computing the first model term as a function of first propagation channel estimates corresponding to the first antenna, the second model term as a function of second propagation channel estimates corresponding to the second antenna, and a third model term modeling noise and inter-cell interference.

3. The method of claim 2, wherein constructing the first impairment model further comprises:
   grouping the computed first, second, and third model terms so that only two scaling parameters associated with the grouped first, second, and third model terms are unknown;
   measuring impairment covariance or data covariance associated with the received composite information signal; and
   estimating values for the two unknown scaling parameters using the measured impairment covariance or data covariance and the computed first, second, and third model terms.

4. The method of claim 1, further comprising calculating processing weights as a function of the first parametric estimate of the impairment covariance and propagation channel estimates corresponding to the first and second antennas.

5. The method of claim 4, wherein the processing weights comprise combining weights for use in a symbol-level equalizer.

6. The method of claim 4, wherein the processing weights comprise filter weights for use in a chip-level equalizer.

7. The method of claim 1, further comprising calculating a signal-to-interference-plus-noise ratio (SINR) estimate as a function of the first parametric estimate of the impairment covariance and first effective net channel response coefficients calculated from propagation channel estimates corresponding to each of the first and second antennas and the first antenna weighting vector.

8. The method of claim 7, further comprising calculating a projected SINR corresponding to a projected transmitted signal configuration, the projected SINR calculated as a function of second effective net channel response coefficients calculated from the propagation channel estimates and a second antenna weighting vector corresponding to the projected transmitted signal configuration.

9. The method of claim 1, wherein the first received composite information signal comprises a dual-stream MIMO signal and wherein the first parametric estimate of the impairment covariance is computed in a dual-stream mode, further comprising, for a second received composite information signal comprising a single-stream MIMO signal received in a single-stream mode:
   computing a first impairment model term as a function of first propagation channel estimates corresponding only to the first antenna, a second impairment model term as a function of second propagation channel estimates corresponding only to the second antenna, and a third impairment model term as a function of the first and second propagation channel estimates;
   grouping the computed first, second, and third impairment model terms so that only two scaling parameters associated with the grouped first, second, and third impairment model terms are unknown;
   measuring impairment covariance or data covariance associated with the second received composite information signal;
   estimating values for the two unknown scaling parameters using the measured impairment covariance or data covariance and the computed first, second, and third impairment model terms;
   constructing a second impairment model based on the first, second, and third impairment model terms and the estimated values for the two unknown scaling parameters; and
   computing a second parametric estimate of the impairment covariance for the second composite received signal using the second impairment model.

10. The method of claim 9, further comprising computing a fourth impairment model term corresponding to noise and other-cell interference and estimating a third scaling parameter corresponding to the fourth impairment model term jointly with estimating values for the two unknown scaling parameters, wherein the second impairment model is further based on the fourth impairment model term and the third scaling parameter.

11. The method of claim 9, further comprising calculating processing weights as a function of the second parametric estimate of the impairment covariance and propagation channel estimates corresponding to the first and second antennas.

12. The method of claim 9, further comprising calculating a signal-to-interference-plus-noise ratio (SINR) estimate as a function of the second parametric estimate of the impairment covariance and first effective net channel response coefficients calculated from propagation channel estimates corresponding to each of the first and second antennas and a single-stream antenna weighting vector mapping the single-stream MIMO signal to the first and second antennas.

13. The method of claim 12, further comprising calculating a projected SINR corresponding to a projected transmitted signal configuration by:
   calculating a revised impairment covariance estimate based on the second parametric estimate of the impairment covariance, the single-stream antenna weighting vector, and a projected antenna weighting vector corresponding to the projected transmitted signal configuration; and
   calculating the projected SINR as a function of the revised impairment covariance estimate.

14. A wireless communication receiver, comprising:
a radio front-end circuit configured to receive a first composite information signal, the first composite information signal comprising at least a first data stream transmitted from first and second transmit antennas according to a first antenna weighting vector; and
one or more processing circuits configured to:
construct a first impairment model for the impairment covariance comprising first and second model terms corresponding to the first and second antennas respectively, wherein the model terms capture propagation channel effects and are independent of the first antenna weighting vector, and wherein the impairment model does not include a cross-antenna interference term; and
compute a first parametric estimate of the impairment covariance, using the first impairment model, by calculating the first and second model terms as a function of propagation channel estimates corresponding to the first and second antennas, respectively, measuring impairment covariance or data covariance associated with the received composite information signal, and estimating values for two or more unknown parameters of the first impairment model using the measured impairment covariance or data covariance and the computed first, second, and third model terms.

15. The wireless communication receiver of claim 14, wherein the one or more processing circuits are configured to construct the first impairment model by computing the first model term as a function of first propagation channel estimates corresponding to the first antenna, the second model term as a function of second propagation channel estimates corresponding to the second antenna, and a third model term modeling noise and inter-cell interference.

16. The wireless communication receiver of claim 14, wherein the one or more processing circuits are further configured to construct the first impairment model by:
grouping the computed first, second, and third model terms so that only two scaling parameters associated with the grouped first, second, and third model terms are unknown;
measuring impairment covariance or data covariance associated with the first received composite information signal; and
estimating values for the two unknown scaling parameters using the measured impairment covariance or data covariance and the computed first, second, and third model terms.

17. The wireless communication receiver of claim 14, wherein the one or more processing circuits are further configured to calculate processing weights as a function of the first parametric estimate of the impairment covariance and propagation channel estimates corresponding to the first and second antennas.

18. The wireless communication receiver of claim 17, wherein the one or more processing circuits comprise a symbol-level equalizer, and wherein the processing weights comprise combining weights for use in the symbol-level equalizer.

19. The wireless communication receiver of claim 17, wherein the one or more processing circuits comprise a chip-level equalizer, and wherein the processing weights comprise filter weights for use in the chip-level equalizer.

20. The wireless communication receiver of claim 14, wherein the one or more processing circuits are further configured to calculate a signal-to-interference-plus-noise ratio (SINK) estimate as a function of the first parametric estimate of the impairment covariance.

21. The wireless communication receiver of claim 14, wherein the first received composite information signal comprises a dual-stream MIMO signal, wherein the one or more processing circuits are further configured to, for a second received composite information signal comprising a single-stream MIMO signal:
compute a first impairment model term as a function of first propagation channel estimates corresponding only to the first antenna, a second impairment model term as a function of second propagation channel estimates corresponding only to the second antenna, and a third impairment model term as a function of the first and second propagation channel estimates;
group the computed first, second, and third impairment model terms so that only two scaling parameters associated with the grouped first, second, and third impairment model terms are unknown;
measure impairment covariance or data covariance associated with the second received composite information signal;
estimate values for the two unknown scaling parameters using the measured impairment covariance or data covariance and the computed first, second, and third impairment model terms;
construct a second impairment model based on the first, second, and third impairment model terms and the estimated values for the two unknown scaling parameters; and
compute a second parametric estimate of the impairment covariance for the second composite received signal using the second impairment model.

22. The wireless communication receiver of claim 21, wherein the one or more processing circuits are further configured to compute a fourth impairment model term corresponding to noise and other-cell interference and to estimate a third scaling parameter corresponding to the fourth impairment model term jointly with estimating values for the two unknown scaling parameters, wherein the second impairment model is further based on the fourth impairment model term and the third scaling parameter.

23. The wireless communication receiver of claim 21, wherein the one or more processing circuits are further configured to calculate processing weights as a function of the second parametric estimate of the impairment covariance and propagation channel estimates corresponding to the first and second antennas.

24. The wireless communication receiver of claim 21, wherein the one or more processing circuits are further configured to calculate a signal-to-interference-plus-noise ratio (SINR) estimate as a function of the second parametric estimate of the impairment covariance and first effective net channel response coefficients calculated from propagation channel estimates corresponding to each of the first and second antennas and a single-stream antenna weighting vector mapping the single-stream MIMO signal to the first and second antennas.

25. The wireless communication receiver of claim 24, wherein the one or more processing circuits are further configured to calculate a projected SINR corresponding to a projected transmitted signal configuration by:
calculating a revised impairment covariance estimate based on the second parametric estimate of the impairment covariance, the single-stream antenna weighting vector, and a projected antenna weighting vector corresponding to the projected transmitted signal configuration; and calculating the projected SINR as a function of the revised impairment covariance estimate.

26. A method of estimating impairment covariance associated with a first received composite information signal comprising at least a first data stream transmitted from first and second antennas according to an antenna weighting vector, the method comprising:

computing a first model term as a function of first propagation channel estimates corresponding to the first antenna, a second model term as a function of second propagation channel estimates corresponding to the second antenna, and a third model term modeling noise and inter-cell interference, wherein the model terms are independent of the antenna weighting vector;

measuring impairment covariance or data covariance associated with the received composite information signal; and estimating values for two unknown scaling parameters for an impairment model, using the measured impairment covariance or data covariance and the computed first, second, and third model terms, wherein the impairment model comprises the first, second, and third model terms, grouped so that only two scaling parameters associated with the grouped first, second, and third model terms are unknown, and wherein the impairment model omits cross-antenna interference terms;

computing a first parametric estimate of the impairment covariance using the impairment model and the estimated values for the two unknown scaling parameters.

* * * * *

UNITED STATES PATENT AND TRADEMARK OFFICE
CERTIFICATE OF CORRECTION

PATENT NO. : 7,957,485 B2
APPLICATION NO. : 12/036337
DATED : June 7, 2011
INVENTOR(S) : Cairns et al.

It is certified that error appears in the above-identified patent and that said Letters Patent is hereby corrected as shown below:

On the Title Pg, Item (56), under "OTHER PUBLICATIONS", Line 1, delete "Convariance" and insert -- Covariance --, therefor.

On the Title Pg, Item (56), under "OTHER PUBLICATIONS", Line 8, delete "Receievers.'" and insert -- Receivers." --, therefor.

On the Title Pg, Item (57), under "ABSTRACT", Line 13, delete "preceding" and insert -- precoding --, therefor.

In Column 2, Line 38, delete "preceding" and insert -- precoding --, therefor.

In Column 2, Line 63, in Equation (1), delete "$R_u = \alpha_1 R_{11} + \alpha_2 R_{22} + \alpha_{12}^+ R_{12}^+ + j\alpha_{12}^- R_{12}^- \beta R_n,$" and insert -- $\mathbf{R}_u = \alpha_1 \mathbf{R}_{11} + \alpha_2 \mathbf{R}_{22} + \alpha_{12}^+ \mathbf{R}_{12}^+ + j\alpha_{12}^- \mathbf{R}_{12}^- + \beta \mathbf{R}_{n},$ --, therefor.

In Column 4, Line 57, delete "preceding" and insert -- precoding --, therefor.

In Column 6, Line 27, delete "(preceding" and insert -- (precoding --, therefor.

In Column 6, Line 54, delete "preceding" and insert -- precoding --, therefor.

In Column 7, Line 23, delete "preceding" and insert -- precoding --, therefor.

In Column 7, Line 24, delete "called preceding" and insert -- called precoding --, therefor.

In Column 7, Line 28, delete "preceding" and insert -- precoding --, therefor.

In Column 7, Lines 29-30, delete "preceding" and insert -- precoding --, therefor.

Signed and Sealed this
Eighteenth Day of October, 2011

David J. Kappos
*Director of the United States Patent and Trademark Office*

CERTIFICATE OF CORRECTION (continued)
U.S. Pat. No. 7,957,485 B2

In Column 7, Line 43, delete "preceding" and insert -- precoding --, therefor.

In Column 11, Line 24, delete "preceding" and insert -- precoding --, therefor.

In Column 13, Line 15, delete "preceding" and insert -- precoding --, therefor.

In Column 13, Line 39, delete "preceding" and insert -- precoding --, therefor.

In Column 13, Line 65, delete "$R_u$" and insert -- $\hat{R}_u$ --, therefor.

In Column 14, Line 9, delete "preceding" and insert -- precoding --, therefor.

In Column 14, Line 11, delete "preceding" and insert -- precoding --, therefor.

In Column 14, Line 48, delete "Circuts (ASICS)" and insert -- Circuits (ASICs) --, therefor.

In Column 18, Line 2, in Claim 20, delete "(SINK)" and insert -- (SINR) --, therefor.